(12) United States Patent
Tapperson

(10) Patent No.: US 6,854,109 B2
(45) Date of Patent: Feb. 8, 2005

(54) TOOL FOR CONVERTING .MAP FILE FORMATS

(75) Inventor: Kevin Gary Tapperson, Williamson County, TX (US)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 09/876,089

(22) Filed: Jun. 7, 2001

(65) Prior Publication Data
US 2002/0199174 A1 Dec. 26, 2002

(51) Int. Cl.[7] .................................................. G06F 9/43
(52) U.S. Cl. ...................................... 717/136; 717/137
(58) Field of Search ................................ 717/121, 127, 717/136, 120

(56) References Cited

U.S. PATENT DOCUMENTS

| | | | | |
|---|---|---|---|---|
| 5,584,023 A | * | 12/1996 | Hsu | 707/204 |
| 5,764,987 A | * | 6/1998 | Eidt et al. | 717/100 |
| 5,848,263 A | | 12/1998 | Oshikiri | 716/3 |
| 5,878,422 A | * | 3/1999 | Roth et al. | 707/100 |
| 5,911,142 A | | 6/1999 | Smith et al. | 707/101 |
| 6,034,314 A | * | 3/2000 | Koike | 84/600 |
| 6,088,693 A | * | 7/2000 | Van Huben et al. | 707/8 |
| 6,088,747 A | * | 7/2000 | Cotugno et al. | 710/74 |
| 6,094,654 A | * | 7/2000 | Van Huben et al. | 707/8 |
| 6,125,304 A | * | 9/2000 | Suzuki | 700/182 |
| 6,144,969 A | * | 11/2000 | Inokuchi et al. | 707/200 |
| 6,154,877 A | * | 11/2000 | Ramkumar et al. | 717/114 |
| 6,195,664 B1 | | 2/2001 | Tolfa | 707/200 |
| 6,199,068 B1 | | 3/2001 | Carpenter | 707/100 |
| 6,230,310 B1 | * | 5/2001 | Arrouye et al. | 717/136 |
| 6,247,175 B1 | * | 6/2001 | Ledford et al. | 717/157 |
| 6,523,170 B1 | * | 2/2003 | Cuomo et al. | 717/136 |
| 6,675,377 B1 | * | 1/2004 | Tanaka | 717/152 |

OTHER PUBLICATIONS

Ping et al. "Migration of legacy web applications to enterprise Java environment Net data to JSP transformation", Proc. of 2003 Conf. for Adv Studies on collaborative Resh. pp 1–15, Oct. 2003.*

Ramirez et al, "Auromatic generation of data conversion program using a data description language", Proc. of ACM SIGFIDET, 1974, pp 207–225.*

Henrard et al, :Strategies for data re engineering, Proc. of 9th working conf. of Reverse Eng. (WCRE) IEEE, 2002, 1–10.*

\* cited by examiner

Primary Examiner—Anil Khatri
(74) Attorney, Agent, or Firm—Kelly K. Kordzik; Leslie A. Van Leeuwan

(57) ABSTRACT

A system, computer program product and method for converting a file in one format to another format. The first file written in a first format, e.g., .MAP file format generated by the IBM Visual Age C++ Linker, may comprise a list of segment portion/offset value pair(s) and a separate list of symbol name/address pair(s). Upon associating symbol name(s) with particular segment portion/offset value pair(s), the .MAP file written in a first format may be converted into a .MAP file written in a second format, e.g., .MAP file format generated by the Microsoft Visual C++ Linker, by writing a list of segment portion/offset pair(s) with their associated symbol name(s).

24 Claims, 8 Drawing Sheets

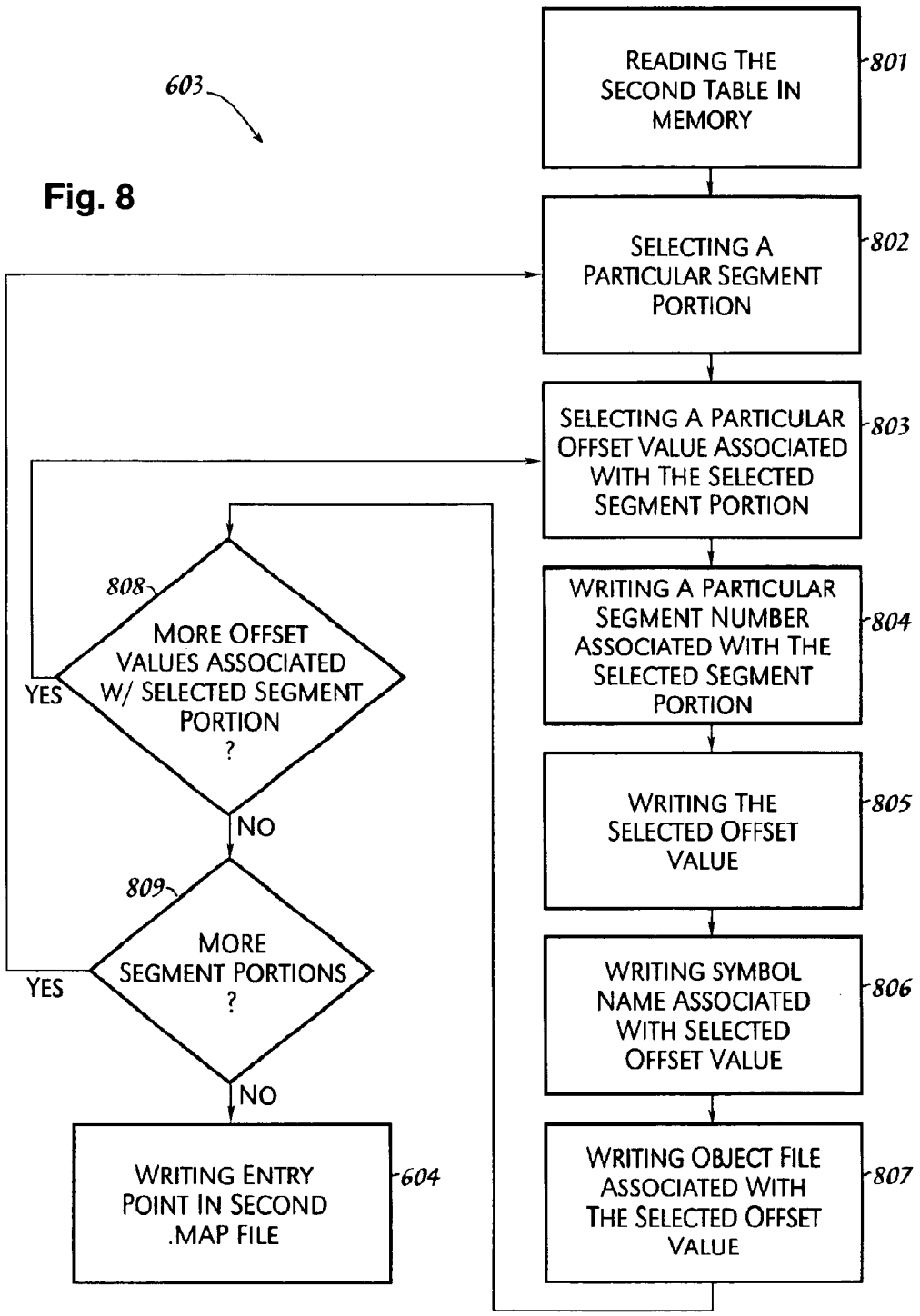

TOOL FOR CONVERTING .MAP FILE FORMATS

TECHNICAL FIELD

The present invention relates to the field of software tools, and more particularly to converting a .MAP file in a first format, e.g., .MAP file format generated by the IBM Visual Age C++ Linker, to a second format, e.g., .MAP file format generated by the Microsoft Visual C++ Linker.

BACKGROUND INFORMATION

Programmers typically write computer programs in a high-level language, e.g., Java, C. A program commonly referred to as a compiler may translate or compile the source files containing these high-level language statements written by the programmer into corresponding object files or modules storing machine instructions or code. A program commonly referred to as a linker may then link or combine these object files into a program suitable for execution or running on a programmable computer. A typical program is revised, compiled and linked many times during its development.

To save time and effort in the software development process, a programmer may use a software tool commonly referred to as a debugger. The debugger helps a programmer debug a program by stopping at certain breakpoints and displaying various programming elements. The debugger may allow the programmer to step through the source code statements one at a time while the corresponding machine instructions are being executed.

Typically, a debugger requires the symbolic names of the data objects and functions defined by the programmer in the source code, i.e., programming language in the source files, as well as the addresses where the data associated with the symbolic names are located to debug a program. The symbolic names and corresponding addresses are typically stored in a file commonly referred to as a .MAP file which is generated by the linker.

One debugger commonly used by software developers is the Microsoft™ windbg debugger. The Microsoft™ windbg debugger currently requires the .MAP file to be in the format generated by the Microsoft Visual C++ Linker. However, other linkers, such as the IBM Visual Age C++ Linker, do not generate .MAP files in a format recognized by the Microsoft™ windbg debugger.

It would therefore be desirable to develop a tool designed to convert .MAP file in a first format, e.g., .MAP file format generated by the IBM Visual Age C++ Linker, into a second format, e.g., .MAP file format generated by the Microsoft Visual C++ Linker.

SUMMARY

The problems outlined above may at least in part be solved in some embodiments by storing symbol name/address pair(s) from a list in a .MAP file written in a first format, e.g., .MAP file format generated by the IBM Visual Age C++ Linker, in a first table and storing segment portion/offset value pair(s) from a list in a .MAP file written in a first format in a second table. Upon associating symbol name(s) with particular segment portion/offset value pair(s), the .MAP file written in a first format may be converted into a .MAP file written in a second format, e.g., .MAP file format generated by the Microsoft Visual C++ Linker.

In one embodiment of the present invention, a method for converting a file in one format to another format may comprise the step of loading a first file written in a first format, e.g., .MAP file format generated by the IBM Visual Age C++ Linker. The first file may comprise a listing of one or more object code segments. Each segment may comprise one or more segment portions where each segment portion is associated with a particular object file. Each segment portion may comprise one or more blocks of addresses of a particular classification or class of object code. Each block of addresses may be associated with a particular offset value with respect to the starting address of the associated segment portion. For example, if the starting address of the first portion of segment #1 is 00410000 and a particular block of address within the first portion of segment #1 is 00410084, then the offset value associated with that particular block of address is 00000084. The first file may further comprise a separate listing of symbol name/address pair(s) where the associated address indicates where the data associated with that symbol name is located. The first file may then be read in order to store particular information in memory. For example, symbol name/address pair(s) may be stored in a first table in memory. Segment portion/offset pair(s) may be stored in a second table in memory. Upon storing particular information in tables, symbol name(s) in the first table in memory may be associated with particular segment portion/offset pair(s) in the second table in memory. Once symbol name(s) have been associated with particular segment portion/offset pair(s), a second file may be written in the second format, e.g., .MAP file format generated by the Microsoft Visual C++ Linker, where the second file comprises a listing of segment portion/offset pair(s) with the associated symbol name(s).

In an embodiment of the present invention, the symbol name(s) may be associated with particular segment portion/offset value pair(s) by reading the first table in memory which comprises a listing of address values associated with symbol name(s). A particular address value associated with a particular symbol name may then be selected. The second table in memory which comprises a listing of segment portion/offset value pair(s) may then be read. A particular segment portion may be selected from the second table. A particular offset value associated with the selected segment portion may then be selected. Upon selecting a particular segment portion/offset value pair, the selected offset value may be added to the to the starting address of the associated segment portion which equals the absolute address of the particular offset value. For example, if the selected offset value had a value of 00000006 and the associated segment portion had a starting address of 00410000, then the absolute address of the offset value would be 00410006. A comparison may be made between the absolute address of the offset value and the selected address of a particular symbol name. If the absolute address of the offset value equals the selected address of the particular symbol name, then the particular symbol name associated with the selected address is associated with the selected segment portion/offset value pair. If the absolute address of the offset value does not equal the selected address of the particular symbol name, then a determination may be made as to whether there are more offset values associated with the selected segment portion for which an absolute address may be generated. If there are more offset values associated with the selected segment portion, then another particular offset value may be selected and added to the address of its associated segment portion to generate another absolute address. The generated absolute address may then be compared with the selected address value of a particular symbol name. If there are no more offset values associated with the selected segment portion, then another particular segment portion may be selected to be paired with its associated offset values.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

A better understanding of the present invention can be obtained when the following detailed description is considered in conjunction with the following drawings, in which:

FIG. 4 is a flowchart of the sub-steps of the step of writing segment information in a .MAP file written in a second format;

FIG. 8 is a flowchart of the sub-steps of the step of writing a symbol name with an associated segment portion/offset value pair in a .MAP file written in a second format.

DETAILED DESCRIPTION

The present invention comprises a system, computer program product and method for converting a file in one format to another format. In one embodiment of the present invention, a first file written in a first format, e.g., .MAP file format generated by the IBM Visual Age C++ Linker, may be loaded in memory. The first file may comprise a list of segment portion/offset value pair(s) and a separate list of symbol name/address pair(s). The first file may then be read in order to store symbol name/address pair(s) in a first table in memory and segment portion/offset pair(s) in a second table in memory. Symbol name(s) may then be associated with particular segment portion/offset value pair(s). A particular symbol name may be associated with a particular segment portion/offset value pair by adding the offset value to the starting address of the associated segment portion which equals the absolute address of the particular offset value. A particular symbol name may then be identified that is associated with that selected segment portion/offset pair when the address associated with that symbol name equals the absolute address of the offset value. Upon associating symbol name(s) with particular segment portion/offset value pair(s), the .MAP file written in a first format may be converted into a .MAP file written in a second format, e.g., .MAP file format generated by the Microsoft Visual C++ Linker, by writing a list of segment portion/offset pair(s) with their associated symbol name(s).

Figure 1:
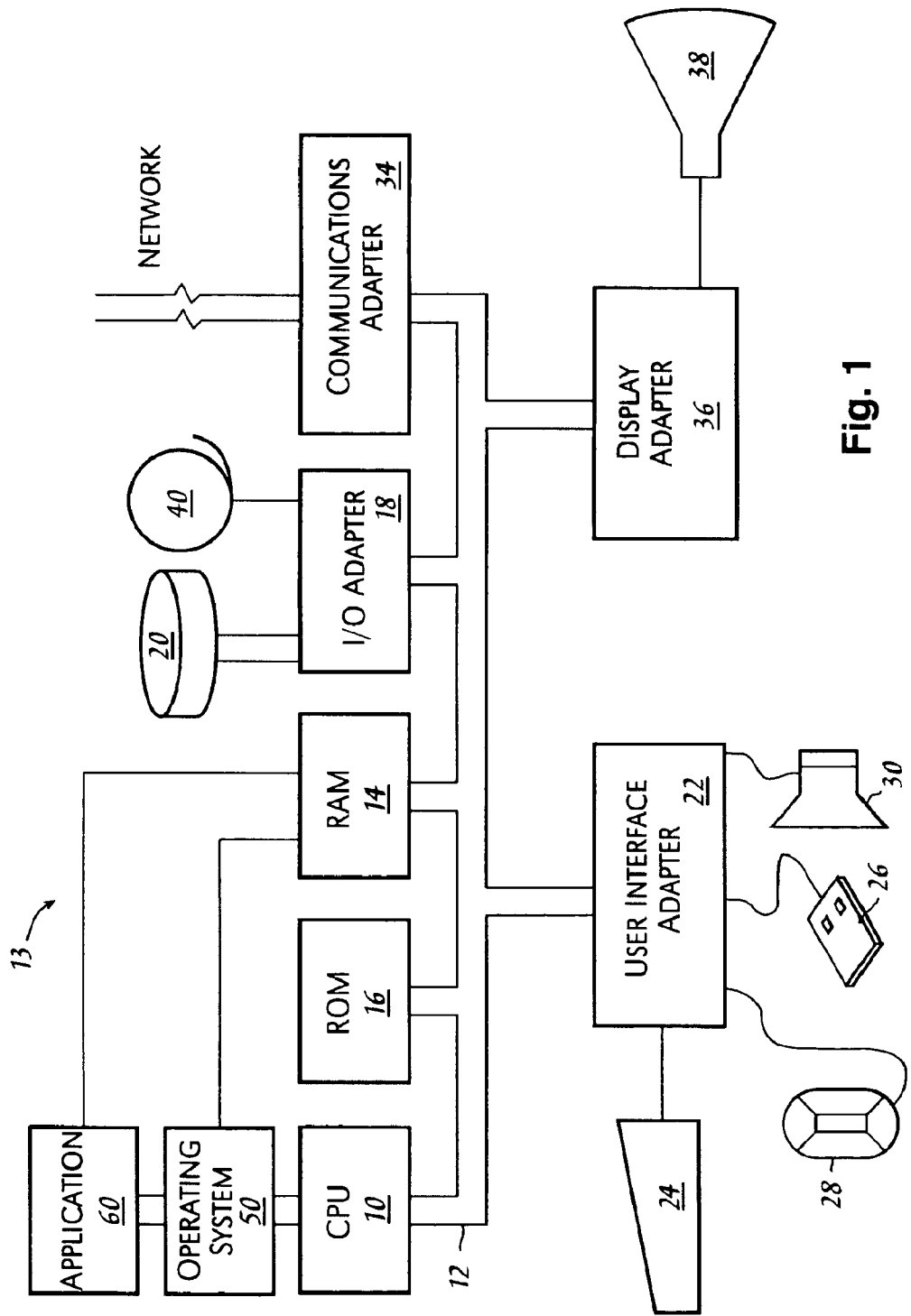
FIG. 1 illustrates an embodiment of a data processing system configured in accordance with the present invention.

FIG. 1—Computer System

FIG. 1 illustrates a typical hardware configuration of a data processing system 13 which is representative of a hardware environment for practicing the present invention. Data processing system 13 has a central processing unit (CPU) 10 coupled to various other components by system bus 12. An operating system 50 runs on CPU 10 and provides control and coordinates the function of the various components of FIG. 1. Application 60, e.g., program for converting a .MAP file in a first format, e.g., .MAP file format generated by the IBM Visual Age C++ Linker, into a second format, e.g., .MAP file format generated by the Microsoft Visual C++ Linker, as described in FIG. 2, runs in conjunction with operating system 50 which implements the various functions to be performed by application 60. Read only memory (ROM) 16 is coupled to system bus 12 and includes a basic input/output system ("BIOS") that controls certain basic functions of data processing system 13. Random access memory (RAM) 14, I/O adapter 18, and communications adapter 34 are also coupled to system bus 12. It should be noted that software components including operating system 50 and application 60 are loaded into RAM 14 which is the computer system's main memory. I/O adapter 18 may be a small computer system interface ("SCSI") adapter that communicates with disk units 20, e.g., disk drive, and tape drives 40. It is noted that the program of the present invention that converts a .MAP file in a first format, e.g., .MAP file format generated by the IBM Visual Age C++ Linker, into a second format, e.g., .MAP file format generated by the Microsoft Visual C++ Linker, as described in FIG. 2, may reside in disk unit 20 or in application 60. Communications adapter 34 interconnects bus 12 with an outside network enabling data processing system 13 to communication with other such systems. Input/Output devices are also connected to system bus 12 via a user interface adapter 22 and a display adapter 36. Keyboard 24, trackball 28, mouse 26 and speaker 30 are all interconnected to bus 12 through user interface adapter 22. Event data may be input to data processing system 13 through keyboard 24, trackball 28 and mouse 26. A display monitor 38 is connected to system bus 12 by display adapter 36. In this manner, a user is capable of inputting to system 13 through keyboard 24, trackball 28 or mouse 26 and receiving output from system 13 via display 38 or speaker 30.

Implementations of the invention include implementations as a computer system programmed to execute the method or methods described herein, and as a computer program product. According to the computer system implementations, sets of instructions for executing the method or methods are resident in the random access memory 14 of one or more computer systems configured generally as described above. Until required by the computer system, the set of instructions may be stored as a computer program product in another computer memory, for example, in disk drive 20 (which may include a removable memory such as an optical disk or floppy disk for eventual use in disk drive 20). Furthermore, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change.

Figure 2:
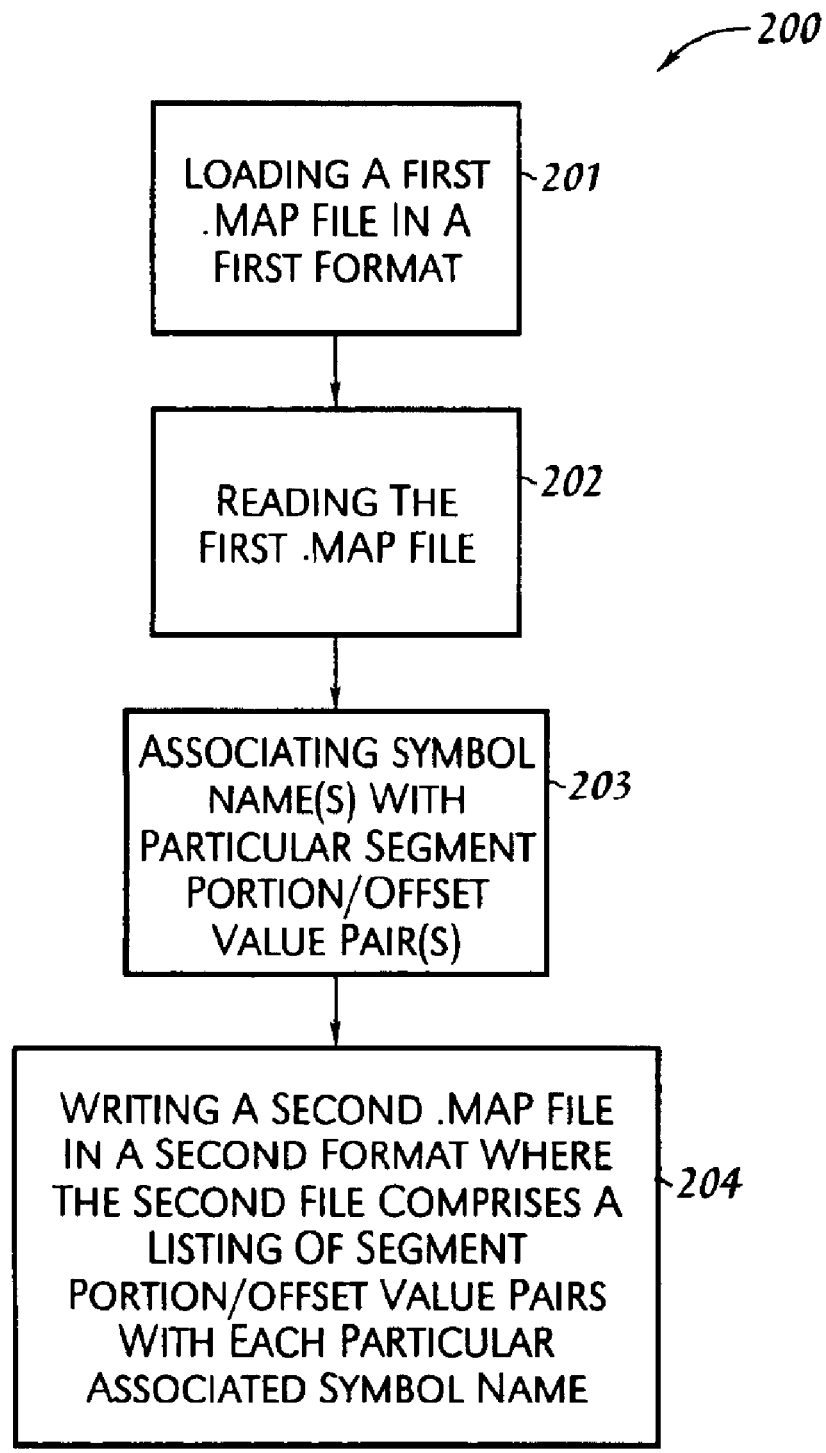
FIG. 2 is a flowchart of a method for converting a .MAP file in one format to another format.

FIG. 2—Flowchart of a Method for Converting a .MAP File in One Format to Another Format FIG. 2 illustrates a flowchart of one embodiment of the present invention of a method 200 for converting a .MAP file in one format, e.g., .MAP file format generated by the IBM Visual Age C++ Linker, into a second format, .MAP file format generated by the Microsoft Visual C++ Linker. As stated in the Background Information section, a programmer may use a software tool commonly referred to as a debugger to save time and effort in the software development process. Typically, a debugger requires the symbolic names of the data objects and functions defined by the programmer in the source code as well as the addresses where the data associated with the symbolic names are located to debug a program. The symbolic names and corresponding addresses are typically stored in a file commonly referred to as a .MAP file which is generated by the linker. One debugger commonly used by software developers is the Microsoft™ windbg debugger. The Microsoft™ windbg debugger currently requires the .MAP file to be in the format generated by the Microsoft Visual C++ Linker. However, other linkers, such as the IBM Visual Age C++ Linker, do not generate .MAP files in a format recognized the by Microsof™ windbg debugger. It would therefore be desirable to develop a tool designed to convert .MAP file in a first format, e.g., .MAP file format generated by the IBM Visual Age C++ Linker, into a second format, e.g., .MAP file format generated by the Microsoft Visual C++ Linker. Method 200 is a method for converting a .MAP file in one format, e.g., .MAP file format generated by the IBM Visual Age C++ Linker, into a second format, .MAP file format generated by the Microsoft Visual C++ Linker.

In step 201, a .MAP file written in a first format, e.g., .MAP file format generated by the IBM Visual Age C++ Linker, may be loaded into a system memory, e.g., RAM 14. The .MAP file written in a first format may comprise a list of one or more segments of one or more object files. As stated in the Background Information section, a program commonly referred to as a compiler may translate or compile the source files containing these high-level language statements written by the programmer into corresponding object files storing machine instructions typically referred to as object code. The object code may comprise one or more segments where each segment may be divided into one or more portions. Each segment portion may be associated with a particular object file. Furthermore, each segment portion is a contiguous block of addresses of a particular classification or class of object code. For example, a segment portion may comprise a contiguous block of addresses storing textual information. Another segment portion may comprise a contiguous block of addresses storing executable code. Another segment portion may comprise a contiguous block of addresses storing data. Another segment portion may comprise a contiguous block of addresses storing constants. Each contiguous block of addresses may comprise one or more smaller blocks of addresses that may be identified by an offset value with respect to the starting address of the associated segment portion. For example, if the starting address of the first portion of segment #1 is 00410000 and a particular block of addresses within the first portion of segment #1 started at 00410084, then the offset value associated with the particular block of addresses within the first portion of segment #1 is 00000084. That is, the offset value may comprise a starting address to access a particular block of address within a particular segment portion that is offset with respect to the starting address of the particular segment portion. The particular block of addresses may comprise data associated with a particular symbol name. A portion of a .MAP file written in a first format, e.g., .MAP file generated by the IBM Visual Age C++ Linker, may comprise a list of segment portions with offset values associated with particular segment portions as illustrated in List 1 below,

| LIST 1 | | | |
|---|---|---|---|
| ---Segment 1 begins--- | | | |
| 00410000 | 0000000BAH | .text | CODE |
| at offset 00000000 | 00006H | kernel32.lib | |
| at offset 00000006 | 00006H | kernel32.lib | |

Referring above, a first portion of segment #1 starts at address 00410000 with a length of 0000000BAH, a name of text KERNEL32.dll, and a class of CODE 32-bit. As stated above, each segment portion may comprise one or more smaller blocks of addresses that may be identified by an offset value with respect to the starting address of the associated segment portion. For example, there is a block of addresses with an offset value of 00000000 with respect to the address of the first portion of segment #1 (00410000 ). The block of addresses with an offset value of 00000000 is a contiguous block of addresses with a length of 00006H associated with the object file kernel32.lib. Similarly, there is a block of addresses with an offset value of 00000006 with respect to the address of the first portion of segment #1 (00410000). The block of addresses with an offset value of 00000006 is a contiguous block of addresses with a length of 00006H associated with the object file kernel32.lib.

The .MAP file written in the first format, e.g., .MAP file format generated by the IBM Visual Age C++ Linker, may further comprise a list of one or more symbol name/address pairs. The corresponding address of a symbol name may be the address in a particular object file that stores the data associated with the symbol name. A portion of a .MAP file written in the first format, e.g., .MAP file format generated by the IBM Visual Age C++ Linker, may comprise a list of one or more symbol name/address pairs as illustrated in List 2 below,

| LIST 2 | |
|---|---|
| Address | Publics by Value |
| 00410000 | CloseHandle@4 |
| 00410006 | CreateFileA@28 |
| 0041000C | DeleteFileA@4 |

Referring above, the address 00410000 is the location in a particular object file that stores the data associated with the symbol name CloseHandle@4. The address 00410006 is the location in a particular object file that stores the data associated with the symbol name CreateFile@28. The address 0041000C is the location in a particular object file that stores the data associated with the symbol name DeleteFileA@4.

Figure 3:
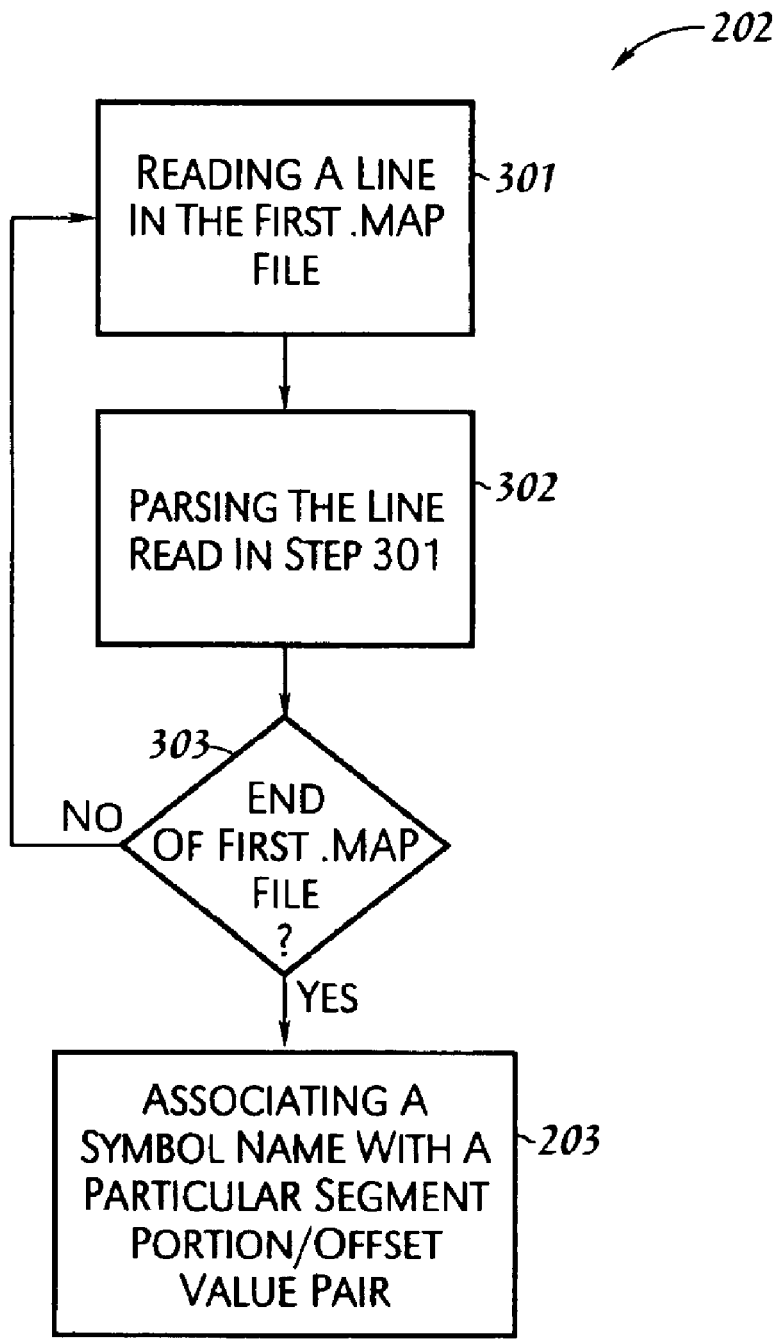
FIG. 3 is a flowchart of the sub-steps of the step of reading a .MAP file written in a first format.

In step 202, the .MAP file loaded in step 201 may be read. Step 202 may comprise sub-steps as illustrated in FIG. 3. Referring to FIG. 3, a particular line in the .MAP file loaded in step 201 may be read in step 301. In step 302, the particular line read in step 301 may be parsed. The particular line may be parsed in step 302 to search and identify keywords in the .MAP file loaded in step 201. These keywords may be followed by information useful in converting the .MAP file loaded in step 201, e.g., .MAP file format generated by the IBM Visual Age C++ Linker, to a second format, .MAP file generated by the Microsoft Visual C++ Linker. For example, each line in the .MAP file loaded in step 201 may be parsed to locate the keywords "Image based", "Program entry point", "Address Publics by Value", and "—Segment". It is noted that any particular keywords may be used to locate information to convert a .MAP file from one format to another and that these are illustrative. The keyword "Image based" may be followed by an address that may be used as a starting address of the converted .MAP file. For example, a portion of a .MAP file written in the first format, e.g., .MAP file format generated by the IBM Visual Age C++ Linker, may include the line as illustrated below,
Image Based at 00400000

The keyword "Program entry point" may be followed by an address that may be used as a starting address for an executable code. For example, a portion of a .MAP file written in the first format, e.g., .MAP file format generated by the IBM Visual Age C++ Linker, may include the line as illustrated below,
Program Entry Point at 004140A0

The keyword "Address Publics by Value" may be followed by a list of symbol name/address pairs as illustrated above in the list of one or more symbol name/address pairs. As stated in the Background Information section, a symbol name may refer to the name of the data objects and functions defined in the source code. An address associated with the symbol name may identify the location of the data associated with the symbol name in an object file. The keyword "—Segment" may be followed by one or more sections of an address of a particular segment portion, a length of the particular segment portion, a name of the particular segment portion and a class of the particular segment portion followed by one or more lines of one or more offset values, i.e., starting addresses of one or more blocks of addresses in a particular object file that are offset to the starting address of the associated segment portion, along with the length of the block of addresses associated with a particular offset value and the object file where the associated block of addresses is located as illustrated above in List 1.

Figure 4:
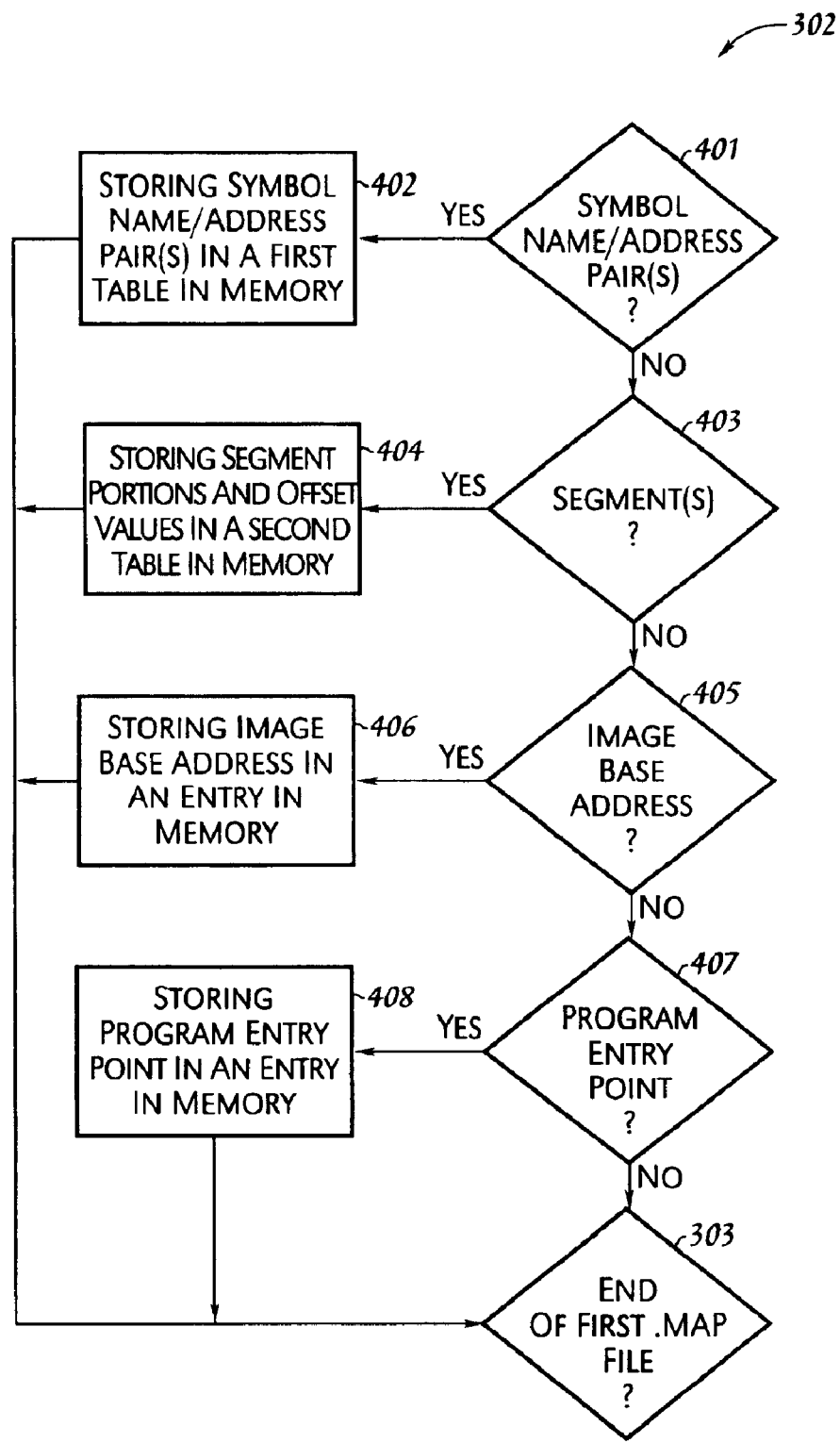
FIG. 4 is a flowchart of the sub-steps of the step of parsing a line read in a .MAP file written in a first format.

Step 302 may comprise sub-steps as illustrated in FIG. 4. In step 401, a determination may be made if there are any symbol name/address pair(s) in the line parsed. As stated above, the symbol name/address pairs may be identified by locating a keyword, e.g., "Address Publics by Value", in the .MAP file written in the first format. Once a keyword, e.g., "Address Publics by Value", is identified, the information following the keyword, e.g., symbol name/address pair(s), may be stored in a first table in memory, e.g., RAM 14, in step 402. For example, the first table in memory, e.g., RAM 14, storing the information following the keyword "Address Publics by Value" in List 2 above may appears as follows:

TABLE 1

| CloseHandle@4 | 00410000 |
| CreateFileA@28 | 00410006 |
| DeleteFileA@4 | 0041000C |

If there are no symbol name/address pair(s) in the line parsed, i.e., the keyword associated with the symbol name/address pair(s) has not been identified, then a determination may be made in step 403 as to whether there are any portions of segments. As stated above, information about a segment portion as well as any offset pairs may be identified by locating a keyword, e.g., "—Segment", in the .MAP file written in the first format. Once a keyword, e.g., "—Segment", is identified, the information following the keyword, e.g., one or more sections of an address of a particular segment portion, a length of the particular segment portion, a name of the particular segment portion, a class of the particular segment portion followed by a list of one or more offset values, length of the block of addresses associated with a particular offset value and the object file where the associated block of addresses is located, may be stored in a second table in memory, e.g., RAM 14, in step 404. For example, the second table in memory, e.g., RAM 14, storing the information following the keyword "—Segment" in List 1 above may appears as follows:

TABLE 2

| 00410000 | 0000000BAH | .text | CODE |
| at offset 00000000 | 00006H | kernel32.lib | |
| at offset 00000006 | 00006H | kernel32.lib | |

If there is no information about a segment, i.e., the keyword associated with the information about a segment has not been identified, then a determination may be made in step 405 as to whether there is an image base address. As stated above, the image base address may be identified by locating a keyword, e g., "Image based", in the .MAP file written in the first format. Once a keyword, e.g., "Image based", is identified, the information following the keyword, e.g., image base address, may be stored in an entry in memory, e.g., RAM 14, in step 406. For example, an entry in memory, e.g., RAM 14, storing the information following the keyword "Image based" may appears as follows:
00400000

If there is no image base address, i.e., the keyword associated with the image base address has not been identified, then a determination may be made in step 407 as to whether there is a program entry point. As stated above, the program entry point may be identified by locating a keyword, e.g., "Program entry point", in the .MAP file written in the first format. Once a keyword, e.g., "Program entry point", is identified, the information following the keyword, e.g., address that may be used as a starting address for an executable code, may be stored in an entry in memory, e.g., RAM 14, in step 408. For example, an entry in memory, e.g., RAM 14, storing the information following the keyword "Program entry point" may appears as follows:
004140A0

If there is not a program entry point, i.e., the keyword associated with the program entry point has not been identified, then a determination may be made in step 303 as to whether there are any more lines in the .MAP file written in the first format that have not been read.

Referring to step 303 of FIG. 3, if there are more lines in the .MAP file written in the first format that have not been read, then the line subsequent to the one previously read may be read in step 301. If all the lines in the .MAP file written in the first format have been read, then symbol name(s) stored in the first table, e.g., Table 1, in memory, e.g., RAM 14, may be associated with particular segment portion/offset value pair(s) stored in the second table, e.g., Table 2, in memory, e.g., RAM 14, in step 203 of FIG. 2.

Figure 5:
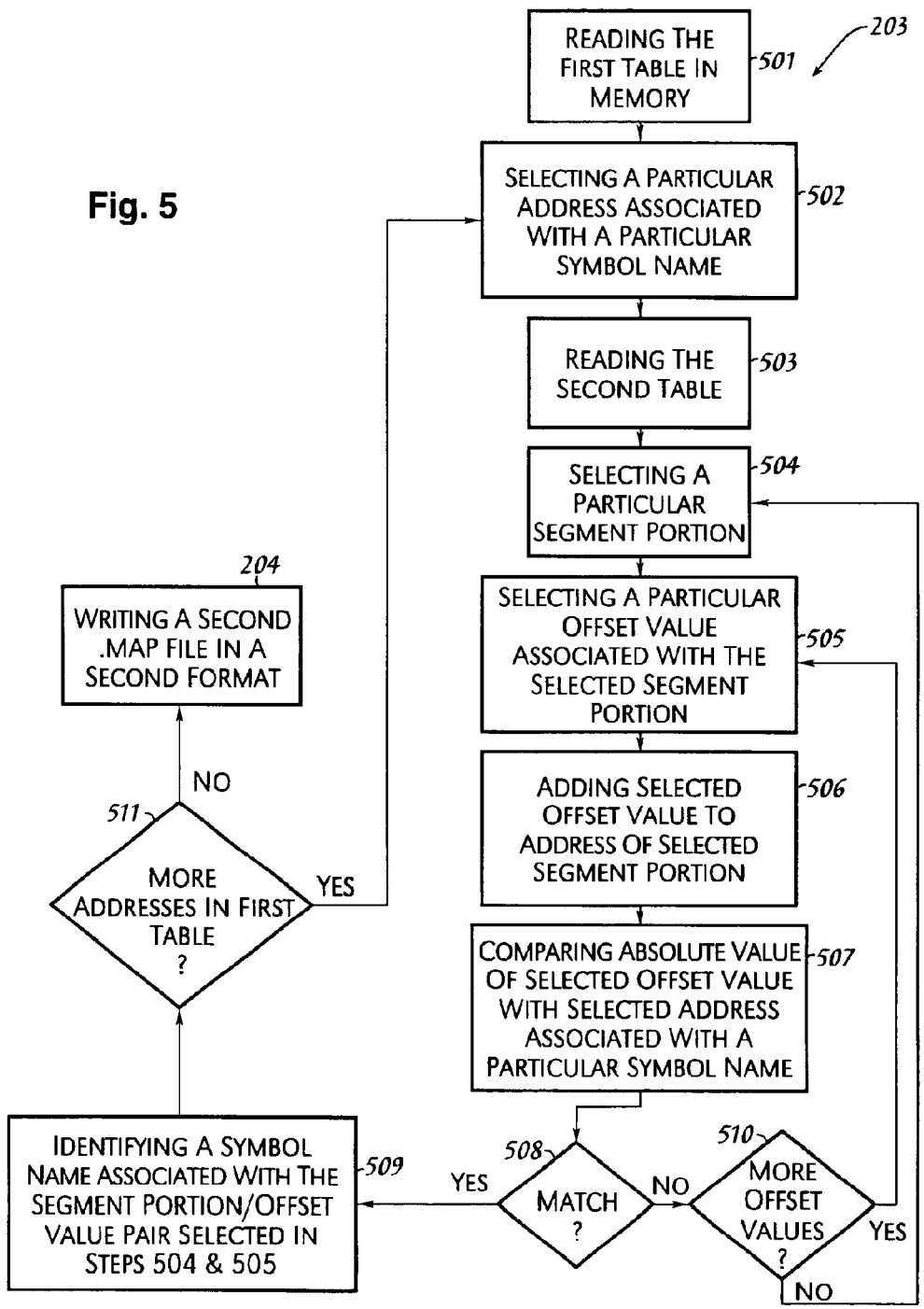
FIG. 5 is a flowchart of the sub-steps of the step of associating a symbol name with a particular segment portion/offset value pair.

Step 203 of FIG. 2 may comprise sub-steps as illustrated in FIG. 5. In step 501, the first table, e.g., Table 1, may be read in memory, e.g., RAM 14, where the first table stores a list of address values associated with symbol name(s). In step 502, a particular address value associated with a particular symbol name is selected.

In step 503, the second table, e.g., Table 2, may be read in memory, e.g., RAM 14, where the second table stores information regarding segment portion addresses, lengths, names and classes, and a list of one or more offset values, length of the block of addresses associated with a particular offset value and the object file where the associated block of addresses is located.

In step 504, a particular segment portion may be selected in the second table. In step 505, a particular offset value associated with the particular segment portion selected in step 504 may be selected.

In step 506, the selected offset value may be added to the address of the selected segment portion that equals an absolute address for the block of addresses associated with the selected offset value. For example, referring to Table 2, adding the offset value of 00000006 with respect to the first portion of segment #1 which has an address of 00410000 would equal an absolute address of 00410006.

In step 507, the absolute address of the offset value calculated in step 506 may be compared with the address value associated with a particular symbol name selected in step 502.

In step 508, a determination may be made as to whether the absolute address of the offset value calculated in step 506 equals the address value selected in step 502. If the absolute address of the offset value calculated in step 506 equals the address value selected in step 502, then in step 509 a symbol name is identified to be associated with the segment portion/offset value pair selected in steps 504 and 505. For example, referring to the listing of symbol name/address pairs in Table 1, the symbol name, CreateFileA@28, has an address of 00410006 which matches the absolute address corresponding to the offset value determined in step 506. Subsequently, the symbol name, CreateFileA@28, is associated with the segment portion/offset value pair, e.g., Segment #1/Offset Value 00000006, determined in step 506.

If there is not a match between the absolute address of the offset value calculated in step 506 and the address value selected in step 502, then in step 510 a determination may be made as to whether there are more offset values for which an absolute address is to be generated for the associated segment portion selected in step 504. If there are more offset values for which an absolute address is to be generated, then another particular offset value may be selected in step 505 and added to the address of its associated segment portion in step 506. If there are no more offset values for which an absolute address is to be generated for the associated segment portion selected in step 504, then a subsequent segment portion may be selected to be paired with its associated offset values in step 504.

Referring to step 509, upon identifying a symbol name associated with a particular segment portion/offset value pair selected in steps 504 and 505, a determination may be made as to whether there are more addresses in the first table that have not been selected in step 511. If there are more addresses in the first table that have not been selected, then another particular address value associated with another particular symbol name is selected in step 502. If all the address values in the first table have been selected, then a second .MAP file is written in a second format, e.g., .MAP file generated by the Microsoft Visual C++ Linker, in step 204 of FIG. 2.

A portion of a .MAP file format written in a second format, e.g., .MAP file generated by the Microsoft Visual C++ Linker, may comprise an entry for a load address where the load address is the starting address to load the .MAP file as illustrated in the line below,
Preferred load address is 00400000

A portion of a .MAP file format written in a second format, e.g., .MAP file generated by the Microsoft Visual C++ Linker, may further comprise a list of segment information including a segment portion number, the segment portion length, the segment portion name and the segment portion class as illustrated in List 3 below,

| | | LIST 3 | |
|---|---|---|---|
| Start | Length | Name | Class |
| 0001:00000000 | 000000BAH | .text | CODE |

A portion of a .MAP file format written in a second format, e.g., .MAP file generated by the Microsoft Visual C++ Linker, may further comprise an entry at the end of the .MAP file corresponding to the starting address of the executable code as illustrated below,
entry point at 0001:000040A0

A portion of a .MAP file format written in a second format, e.g., .MAP file generated by the Microsoft Visual C++ Linker, may further comprise a list including segment portion/offset pair(s) along with the associated symbol name and the corresponding object file storing the data associated with the symbol name as illustrated in List 4 below,

| | LIST 4 | |
|---|---|---|
| Address | Publics by Value | Object File |
| 0001:00000000 | CloseHandle@4 | kernel32.lib |
| 0001:00000006 | CreateFileA@28 | kernel32.lib |
| 0001:000000C | DeleteFile@4 | kernel32.lib |

As stated above, the .MAP file written in a first format has a separate list for symbol name/address pair(s) and segment portion/offset pair(s). By associating symbol name(s) with particular segment portion/offset value pair(s) in step 203 of FIG. 2, a second .MAP file in a second format, e.g., generated by the Microsoft Visual C++ Linker, may be generated in step 204 of FIG. 2 that may be in a format recognized by the particular debugger, e.g., Microsoft™ windbg debugger.

Figure 6:
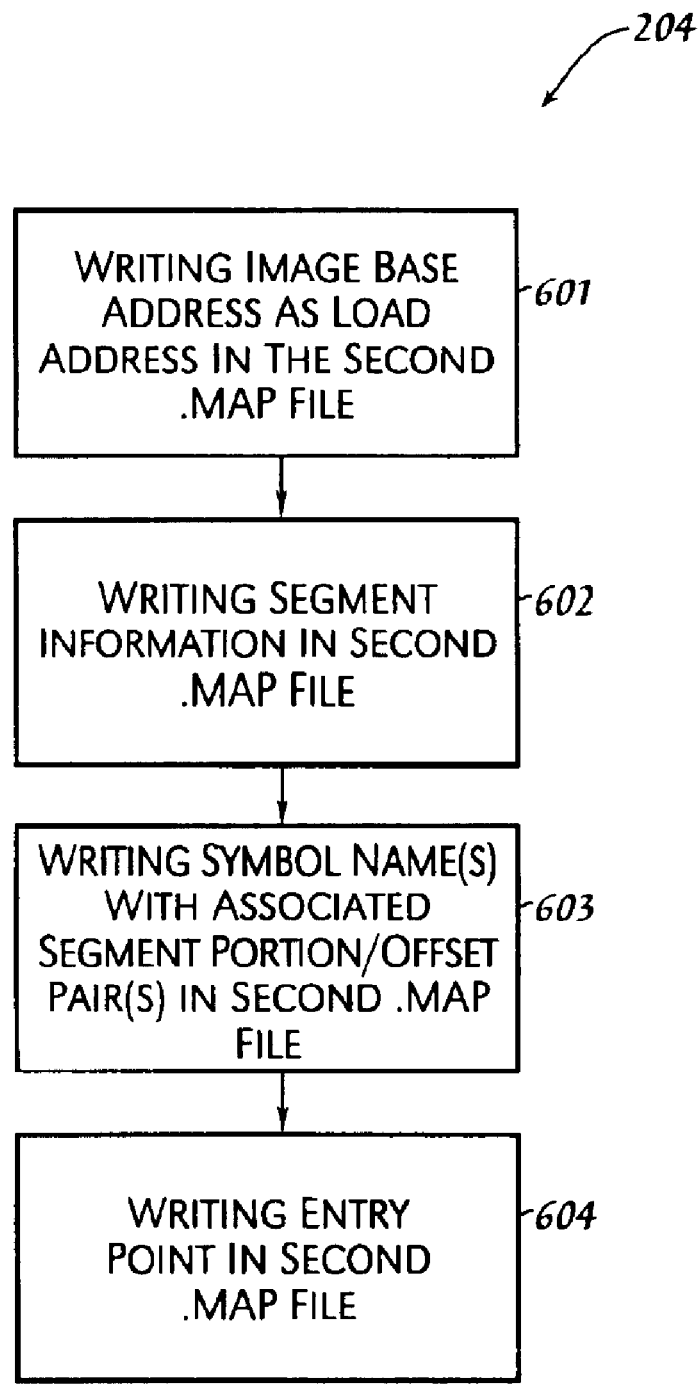
FIG. 6 is a flowchart of the sub-steps of the step of writing a .MAP file in a second format.
Figure 7:
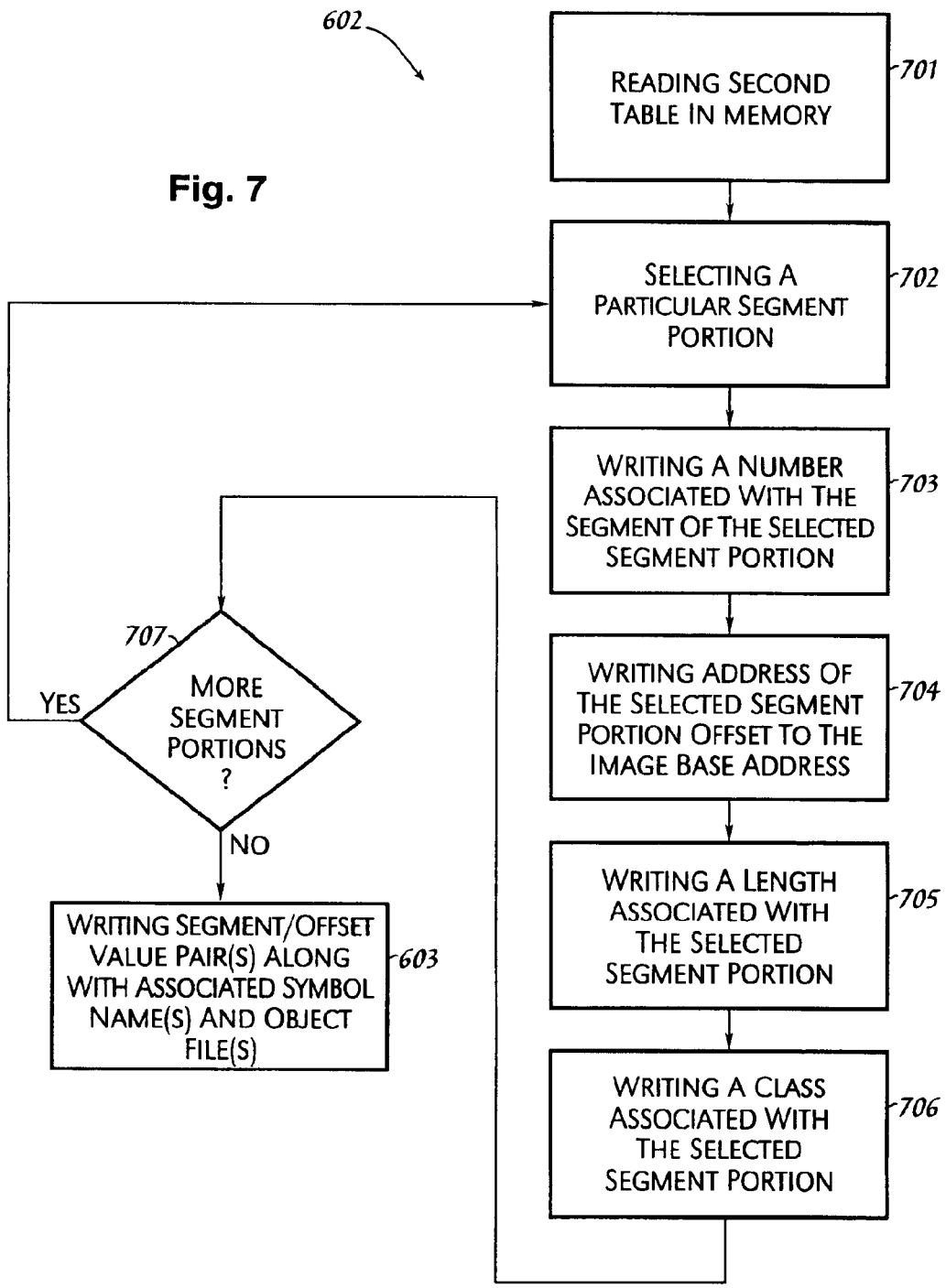
FIG. 7 is a flowchart of the sub-steps of the step of writing segment information in a .MAP file written in a second format.

Step 204 of FIG. 2 may comprise sub-steps as illustrated in FIG. 6. Referring to FIG. 6, in step 601, the image base address stored in an entry in memory, e.g., RAM 14, in step 406 may be written in an entry in a second .MAP file as the load address. In step 602, segment portion information, e.g., number, length, name, class, for each particular segment portion in the first .MAP file may be written in a list comprising segment information in the second .MAP file as illustrated in List 3. Step 602 may comprise sub-steps as illustrated in FIG. 7. Referring to FIG. 7, in step 701, the segment information may be read from the second table in memory, e.g., RAM 14, generated in step 404. As stated above, the second table, e.g., Table 2, stores information regarding segment portion addresses, lengths, names and classes. In step 702, a particular segment portion may be selected. In step 703, a number associated with the segment of the selected segment portion, e.g., 0001 in List 3, may be written in a first column in a list comprising segment information in the second .MAP file.

In step 704, an address of the selected segment portion offset to the image base address stored in an entry in memory, e.g., RAM 14, may be written in a second column in a list in the second .MAP file, e.g., 00000000 in List 3. It is noted that the fifth digit in the address of the selected segment portion indicates which particular segment the selected segment portion is associated therewith. That is, the selected segment portion is a portion of a particular segment indicated in the fifth digit in the address of the selected segment portion. For example, referring to Table 2, the address of the first portion of segment #1 has an address of 00410000 where the fifth digit is a 1 which indicates that the first portion is a portion of segment #1. In one embodiment, the address of the selected segment portion read in the second table in memory, e.g., RAM 14, may be subtracted from the image base address stored in an entry in memory, e.g., RAM 14, resulting in an address offset to the image base address. Since the fifth digit in the address of the selected segment portion indicates the associated segment, the fifth digit is ignored, i.e., treated as zero, in the calculation to determine the address offset to the image base address. For example, the address of the first portion of segment #1 is treated as having the address of 004000000 which is subtracted from the image base address, e.g., 00400000. The result is 00000000 as illustrated in the second column of List 3.

In step 705, the length associated with the selected segment portion may be written in a third column in a list, e.g., List 3, in the second .MAP file. In step 706, the name associated with the selected segment portion may be written in a fourth column in a list, e.g., List 3, in the second .MAP file. In step 707, the class associated with the selected segment portion may be written in a fifth column in a list, e.g., List 3, in the second .MAP file. In step 708, a determination may be made as to whether there are more segment portions whose information has not been written in the list comprising segment information in the second .MAP file. If there are more segment portions whose information has not been written in the list comprising segment information in the second .MAP file, then another particular segment portion may be selected in step 702. If the information in all the segment portions has been written in the list comprising segment information in the second .MAP file, then segment portion/offset pair(s) along with the associated symbol name and the corresponding object file storing the data associated with the symbol name may be written in a separate list in the second .MAP file in step 603 of FIG. 6. Step 603 may comprise sub-steps as illustrated in FIG. 8.

Referring to FIG. 8, in step 801, the second table, e.g., Table 2, may be read in memory, e.g., RAM 14, where the second table stores information regarding segment portion addresses, lengths, names and classes, and a list of one or more offset values, length of the block of addresses associated with a particular offset value and the object file where the associated block of addresses is located.

In step 802, a particular segment portion may be selected in the second table. In step 803, a particular offset value may be selected associated with the particular segment portion selected in step 802.

In step 804, a particular segment number associated with the selected segment portion in step 802 may be written in a first column in a list, e.g., List 4, comprising segment portion/offset pair(s) and the associated symbol name(s) and object file(s) in the second .MAP file. In step 805, the offset value selected in step 803 may be written in a second column in the list, e.g., List 4, in the second .MAP file. In step 806, the symbol name associated with the segment portion/offset pair written in steps 804 and 805 may be written in a third column in the list, e.g., List 4, in the second .MAP file. In step 807, the object file associated with the symbol name written in step 806, i.e., associated with the offset value selected in step 803, may be written in a fourth column in the list, e.g., List 4, in the second .MAP file. In step 808, a determination may be made as to whether there are more offset values associated with the segment portion selected in step 802. If there are more offset values associated with the segment portion selected in step 802, then another particular offset value associated with the selected segment portion may be selected in step 803. If there are no more offset values associated with the segment portion selected in step 802, then a determination may be made as to whether there are more segment portions in the second table in memory, e.g., RAM 14, that have not been written in the list comprising segment portion/offset pair(s) and the associated symbol name(s) and object file(s) in the second .MAP file. If there are more segment portions in the second table that have not been written in the list comprising segment portion/offset pair(s) and the associated symbol name(s) and object file(s) in the second .MAP file, then another segment portion may be selected in step 802. If all the segment portions in the second table in memory, e.g., RAM 14, have been written in the list comprising segment portion/offset pair(s) and the associated symbol name(s) and object file(s) in the second .MAP file then an entry, e.g., program entry point, may be written at the end of the second file corresponding to the starting address of the executable code in step 604. As stated above, the program entry point may have been stored in an entry in memory, e.g., RAM, in step 408.

It is noted that the lists and tables illustrating portions of a first .MAP file, e.g., .MAP file format generated by the IBM Visual C++ Linker, and a second .MAP file, .MAP file format generated by the Microsoft Visual C++ Linker, are illustrative/It is further noted that method 200 may be executed in a different order presented and that the order presented in the discussion of FIGS. 2–8 is illustrative. It is further noted that certain steps may be executed almost concurrently.

Although the system, computer program product and method are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

What is claimed is:

1. A method for converting a file in one format to another format comprising the steps of:

loading a first file written in a first format, wherein said first file comprises a first listing of one or more portions of object code segments, wherein each of said one or more portions of object code segments comprises one or more blocks of addresses, wherein each of said one or more blocks is associated with a particular offset value, wherein said first file further comprises a second listing of one or more symbol names and corresponding addresses;

reading said first file;

associating one or more symbol names with corresponding segment portion/offset value pairs; and writing a second file in a second format, wherein said second file comprises a third listing including one or more segment portion/offset value pairs and associated symbol names.

2. The method as recited in claim 1, wherein said step of reading said first file comprises the steps of:

reading a particular line in said first file;

parsing said particular line in said first file; and determining whether there are more lines in said first file.

3. The method as recited in claim 1, wherein said step of reading said first file comprises the steps of:

storing one or more symbol name/address pairs in a first table in a memory;

storing one or more segment portion/offset value pairs in a second table in said memory;

storing an image base address in an entry in said memory, wherein said image base address is a starting address of said second file; and storing a program entry point in an entry in said memory, wherein said program entry point is a starting address for an executable code.

4. The method as recited in claim 3, wherein said step of associating one or more symbol names with corresponding segment portion/offset value pairs comprises the steps of:

reading said first table in said memory;

selecting a first address associated with a first symbol name;

reading said second table in said memory;

selecting a first particular segment portion;

selecting a first offset value associated with said first selected segment portion;

adding said first offset value to an address of said first selected segment portion generating a first absolute address of said first offset value;

comparing said first absolute address of said first offset value with said first address associated with said first symbol name; and identifying said first symbol name as being associated with said first offset value if said first absolute address of said first offset value equals said first address associated with said first symbol name.

5. The method as recited in claim 4 further comprising the step of:

determining whether said first absolute address of said first offset value equals said first address associated with said first symbol name.

6. The method as recited in claim 5, wherein if said first absolute address of said first offset value does not equal said first address associated with said first symbol name then the method further comprises the step of:

determining whether there are more offset values associated with said first selected segment portion that have not been added to said address of said first selected segment portion.

7. The method as recited in claim 6, wherein if there are more offset values associated with said first selected segment portion that have not been added to said address of said first selected segment portion then the method further comprises the steps of:

selecting a second offset value associated with said first selected segment portion;

adding said second offset value to said address of said first selected segment portion which equals a second absolute address of said second offset value;

comparing said second absolute address of said second offset value with said first address associated with said first symbol name; and identifying said first symbol name as being associated with said second offset value if said second absolute address of said second offset value equals said first address associated with said first symbol name.

8. The method as recited in claim 6, wherein if all offset values associated with said first selected segment portion have been added to said address of said first selected segment portion then the method further comprises the steps of:

selecting a second particular segment portion;

selecting a second offset value associated with said second selected segment portion;

adding said second offset value to an address of said second selected segment portion which equals a second absolute address of said second offset value;

comparing said second absolute address of said second offset value with said first address associated with said first symbol name; and identifying said first symbol name as being associated with said second offset value if said second absolute address of said second offset value equals said first address associated with said first symbol name.

9. A computer program product having a computer readable medium having computer program logic recorded thereon for converting a file in one format to another format, comprising:

programming operable for loading a first file written in a first format, wherein said first file comprises a first listing of one or more portions of object code segments, wherein each of said one or more portions of object code segments comprises one or more blocks of addresses, wherein each of said one or more blocks is associated with a particular offset value, wherein said first file further comprises a second listing of one or more symbol names and corresponding addresses;

programming operable for reading said first file;

programming operable for associating one or more symbol names with corresponding segment portion/offset value pairs; and programming operable for writing a second file in a second format, wherein said second file comprises a third listing including one or more segment portion/offset value pairs and associated symbol names.

10. The computer program product as recited in claim 9, wherein said programming step of reading said first file comprises:

programming operable for reading a particular line in said first file;

programming operable for parsing said particular line in said first file; and programming operable for determining whether there are more lines in said first file.

11. The computer program product as recited in claim 9, wherein said programming step of reading said first file comprises:

programming operable for storing one or more symbol name/address pairs in a first table in a memory;

programming operable for storing one or more segment portion/offset value pairs in a second table in said memory;

programming operable for storing an image base address in an entry in said memory, wherein said image base address is a starting address of said second file; and programming operable for storing a program entry point in an entry in said memory, wherein said program entry point is a starting address for an executable code.

12. The computer program product as recited in claim 11, wherein said programming step of associating one or more symbol names with corresponding segment portion/offset value pairs comprises:

programming operable for reading said first table in said memory;

programming operable for selecting a first address associated with a first symbol name;

programming operable for reading said second table in said memory;

programming operable for selecting a first particular segment portion;

programming operable for selecting a first offset value associated with said first selected segment portion;

programming operable for adding said first offset value to an address of said first selected segment portion generating a first absolute address of said first offset value;

programming operable for comparing said first absolute address of said first offset value with said first address associated with said first symbol name; and programming operable for identifying said first symbol name as being associated with said first offset value if said first absolute address of said first offset value equals said first address associated with said first symbol name.

13. The computer program product as recited in claim 12 further comprises:

programming operable for determining whether said first absolute address of said first offset value equals said first address associated with said first symbol name.

14. The computer program product as recited in claim 13, wherein if said first absolute address of said first offset value does not equal said first address associated with said first symbol name then the computer program product further comprises:

programming operable for determining whether there are more offset values associated with said first selected segment portion that have not been added to said address of said first selected segment portion.

15. The computer program product as recited in claim 14, wherein if there are more offset values associated with said first selected segment portion that have not been added to said address of said first selected segment portion then the computer program product further comprises:

programming operable for selecting a second offset value associated with said first selected segment portion;

programming operable for adding said second offset value to said address of said first selected segment portion which equals a second absolute address of said second offset value;

programming operable for comparing said second absolute address of said second offset value with said first address associated with said first symbol name; and programming operable for identifying said first symbol name as being associated with said second offset value if said second absolute address of said second offset value equals said first address associated with said first symbol name.

16. The computer program product as recited in claim 14, wherein if all offset values associated with said first selected segment portion have been added to said address of said first selected segment portion then the computer program product further comprises:

programming operable for selecting a second particular segment portion;

programming operable for selecting a second offset value associated with said second selected segment portion;

programming operable for adding said second offset value to an address of said second selected segment portion which equals a second absolute address of said second offset value;

programming operable for comparing said second absolute address of said second offset value with said first address associated with said first symbol name; and programming operable for identifying said first symbol name as being associated with said second offset value if said second absolute address of said second offset value equals said first address associated with said first symbol name.

17. A system, comprising:

a processor;

a memory unit operable storing a computer program operable for converting a file in one format to another format; and a bus system coupling the processor to the memory, wherein the computer program is operable for performing the following programming steps:

loading a first file written in a first format, wherein said first file comprises a first listing of one or more portions of object code segments, wherein each of said one or more portions of object code segments comprises one or more blocks of addresses, wherein each of said one or more blocks is associated with a particular offset value, wherein said first file further comprises a second listing of one or more symbol names and corresponding addresses;

reading said first file;

associating one or more symbol names with corresponding segment portion/offset value pairs; and writing a second file in a second format, wherein said second file comprises a third listing including one or more segment portion/offset value pairs and associated symbol names.

18. The system as recited in claim 17, wherein said programming step of reading said first file comprises the programming steps:

reading a particular line in said first file;

parsing said particular line in said first file; and determining whether there are more lines in said first file.

19. The system as recited in claim 17, wherein said programming step of reading said first file comprises the programming steps:

storing one or more symbol name/address pairs in a first table in a memory;

storing one or more segment portion/offset value pairs in a second table in said memory;

storing an image base address in an entry in said memory, wherein said image base address is a starting address of said second file; and storing a program entry point in an entry in said memory, wherein said program entry point is a starting address for an executable code.

20. The system as recited in claim 19, wherein said programming step of associating one or more symbol names with corresponding segment portion/offset value pairs comprises the programming steps:

reading said first table in said memory;

selecting a first address associated with a first symbol name;

reading said second table in said memory;

selecting a first particular segment portion;

selecting a first offset value associated with said first selected segment portion;

adding said first offset value to an address of said first selected segment portion generating a first absolute address of said first offset value;

comparing said first absolute address of said first offset value with said first address associated with said first symbol name; and identifying said first symbol name as being associated with said first offset value if said first absolute address of said first offset value equals said first address associated with said first symbol name.

21. The system as recited in claim 20, wherein the computer program is further operable to perform the programming step:

determining whether said first absolute address of said first offset value equals said first address associated with said first symbol name.

22. The system as recited in claim 21, wherein if said first absolute address of said first offset value does not equal said first address associated with said first symbol name then the computer program is further operable to perform the programming step:

determining whether there are more offset values associated with said first selected segment portion that have not been added to said address of said first selected segment portion.

23. The system as recited in claim 22, wherein if there are more offset values associated with said first selected segment portion that have not been added to said address of said first selected segment portion then the computer program is further operable to perform the programming steps:

selecting a second offset value associated with said first selected segment portion;

adding said second offset value to said address of said first selected segment portion which equals a second absolute address of said second offset value;

comparing said second absolute address of said second offset value with said first address associated with said first symbol name; and identifying said first symbol name as being associated with said second offset value if said second absolute address of said second offset value equals said first address associated with said first symbol name.

24. The system as recited in claim 22, wherein if all offset values associated with said first selected segment portion have been added to said address of said first selected segment portion then the computer program is further operable to perform the programming steps:

selecting a second particular segment portion;

selecting a second offset value associated with said second selected segment portion;

adding said second offset value to an address of said second selected segment portion which equals a second absolute address of said second offset value;

comparing said second absolute address of said second offset value with said first address associated with said first symbol name; and identifying said first symbol name as being associated with said second offset value if said second absolute address of said second offset value equals said first address associated with said first symbol name.

* * * * *